(12) United States Patent
Becquin et al.

(10) Patent No.: US 10,463,990 B2
(45) Date of Patent: Nov. 5, 2019

(54) MULTIPHASE PUMPING SYSTEM WITH RECUPERATIVE COOLING

(71) Applicant: General Electric Company, Schenectady, NY (US)

(72) Inventors: Guillaume Becquin, Bavaria (DE); Mark Ronald Lynass, Bavaria (DE); Trevor James Kirsten, Bavaria (DE)

(73) Assignee: General Electric Company, Schenectady, NY (US)

(*) Notice: Subject to any disclaimer, the term of this patent is extended or adjusted under 35 U.S.C. 154(b) by 514 days.

(21) Appl. No.: 14/967,657

(22) Filed: Dec. 14, 2015

(65) Prior Publication Data
US 2017/0167809 A1 Jun. 15, 2017

(51) Int. Cl.
| | |
|---|---|
| *B01D 19/00* | (2006.01) |
| *F04B 47/06* | (2006.01) |
| *F04B 23/02* | (2006.01) |
| *F04B 19/06* | (2006.01) |
| *E21B 43/12* | (2006.01) |
| *F04B 39/16* | (2006.01) |
| *F04B 53/08* | (2006.01) |

(52) U.S. Cl.
CPC ........ *B01D 19/0063* (2013.01); *E21B 43/121* (2013.01); *F04B 19/06* (2013.01); *F04B 23/025* (2013.01); *F04B 39/16* (2013.01); *F04B 47/06* (2013.01); *F04B 53/08* (2013.01)

(58) Field of Classification Search
CPC ... B01D 19/0063; E21B 43/121; E21B 43/24; E21B 36/006; F04B 19/06; F04B 23/025; F04B 39/16; F04B 47/06; F04B 53/08
See application file for complete search history.

(56) References Cited

U.S. PATENT DOCUMENTS

| | | | |
|---|---|---|---|
| 4,712,984 A | 12/1987 | Lepert | |
| 4,981,175 A | 1/1991 | Powers | |
| 5,845,709 A | 12/1998 | Mack et al. | |
| 6,007,306 A | 12/1999 | Vilagines | |
| 6,082,133 A | 7/2000 | Barclay et al. | |
| 6,234,030 B1 | 5/2001 | Butler | |
| 6,457,950 B1 | 10/2002 | Cooper et al. | |

(Continued)

FOREIGN PATENT DOCUMENTS

| | | |
|---|---|---|
| GB | 2215408 A | 9/1989 |
| WO | 2014027895 A1 | 2/2014 |
| WO | 2014151967 A1 | 9/2014 |

OTHER PUBLICATIONS

Leistritz Advanced Technologies Corporation; Multiphase Production Systems Product Manual; Allendale, NJ; 2014.

(Continued)

*Primary Examiner* — Travis C Ruby
(74) *Attorney, Agent, or Firm* — Baker Hughes Patent Organization (57) ABSTRACT

A multiphase pumping system for transporting a fluid includes a multiphase pump configured to increase pressure within the fluid and a recuperator in fluid communication with the multiphase pump. The recuperator is configured to remove thermal energy from a fluid upstream of the multiphase pump and is further configured to add thermal energy to a fluid downstream of the multiphase pump. The multiphase pumping system further includes a cooler configured to remove thermal energy from the fluid upstream of the multiphase pump.

19 Claims, 4 Drawing Sheets

(56) References Cited

U.S. PATENT DOCUMENTS

| | | |
|---|---|---|
| 7,152,682 B2 | 12/2006 | Hopper |
| 7,434,621 B2 | 10/2008 | Aarvik et al. |
| 7,569,097 B2 | 8/2009 | Campen et al. |
| 7,708,059 B2 | 5/2010 | Shaw |
| 7,717,182 B2 | 5/2010 | Butler et al. |
| 8,393,876 B2 | 3/2013 | Sloteman et al. |
| 2009/0149969 A1 | 6/2009 | Slupphaug et al. |
| 2010/0011875 A1 | 1/2010 | Vyas et al. |
| 2011/0044831 A1 | 2/2011 | Cunningham et al. |
| 2011/0223039 A1 | 9/2011 | Fang et al. |
| 2011/0259596 A1 | 10/2011 | Daigle |
| 2011/0293441 A1 | 12/2011 | Anderson et al. |
| 2012/0138307 A1 | 6/2012 | Berg |
| 2013/0305744 A1 | 11/2013 | Laursen et al. |
| 2014/0099225 A1 | 4/2014 | Denny |

OTHER PUBLICATIONS

Pradeep, Chaminda et al.; Co-operative Sensor Fusion Using Time Warping in Multimodal Tomometry for Process Control; 2012 IEEE Conference on Control, Systems and Industrial Informatics; Bandung, Indonesia; Sep. 23-26, 2012; 6 pp.

Ortiz, J. et al.; PC Based Multi-Phase Flow Loop Sensor Calibration; Canadian Conference on Electrical and Computer Engineering; St. John's Newfoundland, Canada; May 3-6, 2009; 4 pp.

Reilly, J.J. et al., "A New Laboratory Gas Circulation Pump for Intermediate Pressures", Review of Scientific Instruments, vol. 42, Issue: 10, pp. 1485-1486, Oct. 1971.

U.S. Appl. No. 14/568,759, filed Dec. 12, 2014 currently entitled Subsea Fluid Processing System and an Associated Method Thereof.

U.S. Appl. No. 14/686,897, filed Apr. 15, 2015 currently entitled Subsea Fluid Processing System with Intermediate Re-Circulation.

Becquin, G., et al., Multiphase Pump System with Intermediate Recirculation, GE Co-Pending U.S. Appl. No. 62/079125, filed Nov. 13, 2014.

MULTIPHASE PUMPING SYSTEM WITH RECUPERATIVE COOLING

BACKGROUND

The field of the invention relates generally to multiphase pumping systems and, more particularly, to systems and methods for controlling the gas volume fraction (GVF) of the fluid transported by the multiphase pumping systems.

As oil and gas fields in shallow waters diminish, producers are tapping offshore fields in deeper waters with oil installations that operate far below the surface of the sea. Typical production equipment and systems for such subsea oil recovery and production include a multiphase pump located in a subsea boosting station which pumps the oil from a well head up a pipeline riser to topside production equipment. The output of an offshore field, received from the well head and at the subsea boosting station, typically includes a combination of hydrocarbon oil, hydrocarbon gas, and water. These production components form production fluids having varying GVF. The multiphase pump is generally designed to operate with the production fluids having relatively low GVF. However, gas slugs may occur due to flow instability of multiple phases of the production fluids when gas separates from a mixed flow to form bubbles. Eventually, these gas slugs may enter the fluid processing system and may cause rapid variations of the GVF to higher values.

These slugs and the resulting higher values of GVF within the fluid may exceed the operating parameters of the multiphase pump, and if allowed to reach the multiphase pump, such slugs and higher values of GVF may contribute to a reduction in the service life of the multiphase pump.

BRIEF DESCRIPTION

In one aspect, a multiphase pumping system for transporting a fluid is provided. The system includes a multiphase pump configured to increase pressure within the fluid and a recuperator in fluid communication with the multiphase pump. The recuperator is configured to remove thermal energy from a fluid upstream of the multiphase pump and is further configured to add thermal energy to a fluid downstream of the multiphase pump. The multiphase pumping system further includes a cooler configured to remove thermal energy from the fluid upstream of the multiphase pump.

In another aspect, a method of transporting a fluid using a multiphase pumping system is provided. The multiphase pumping system includes a multiphase pump configured to transport the fluid, a cooler, and a recuperator. The method includes receiving the fluid by the multiphase pumping system, removing thermal energy from the fluid using the recuperator, removing thermal energy from the fluid using the cooler, pumping the fluid using the multiphase pump, and adding thermal energy to the fluid using the recuperator.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The subsea multiphase pumping systems and methods as described herein overcome a number of deficiencies associated with known systems and methods of subsea pumping stations. Specifically, the pumping systems use a recuperator and a cooler to remove thermal energy from the production fluid, condensing the gas phase therein, and lowering the gas volume fraction of the production fluid. The multiphase pump intakes the production fluid with a gas volume fraction below the pump specifications, thereby reducing the impact of gas slugs within the production fluid on the pump. Downstream of the multiphase pump the production fluid is channeled through the recuperator which adds thermal energy to the production fluid. This heating of the production fluid reduces formation of deposits, such as hydrates, waxes, and asphaltenes, within the system pipeline as the production fluid is lifted towards the surface. As such, the pumping systems and methods described herein offer advantages that include, without limitation, increased pump efficiency, increased pump life-cycle, as well as reduced system cost. Additionally, the pumping systems and methods facilitate system size reduction and integration with other known subsea pumping systems currently in use.

Figure 1:
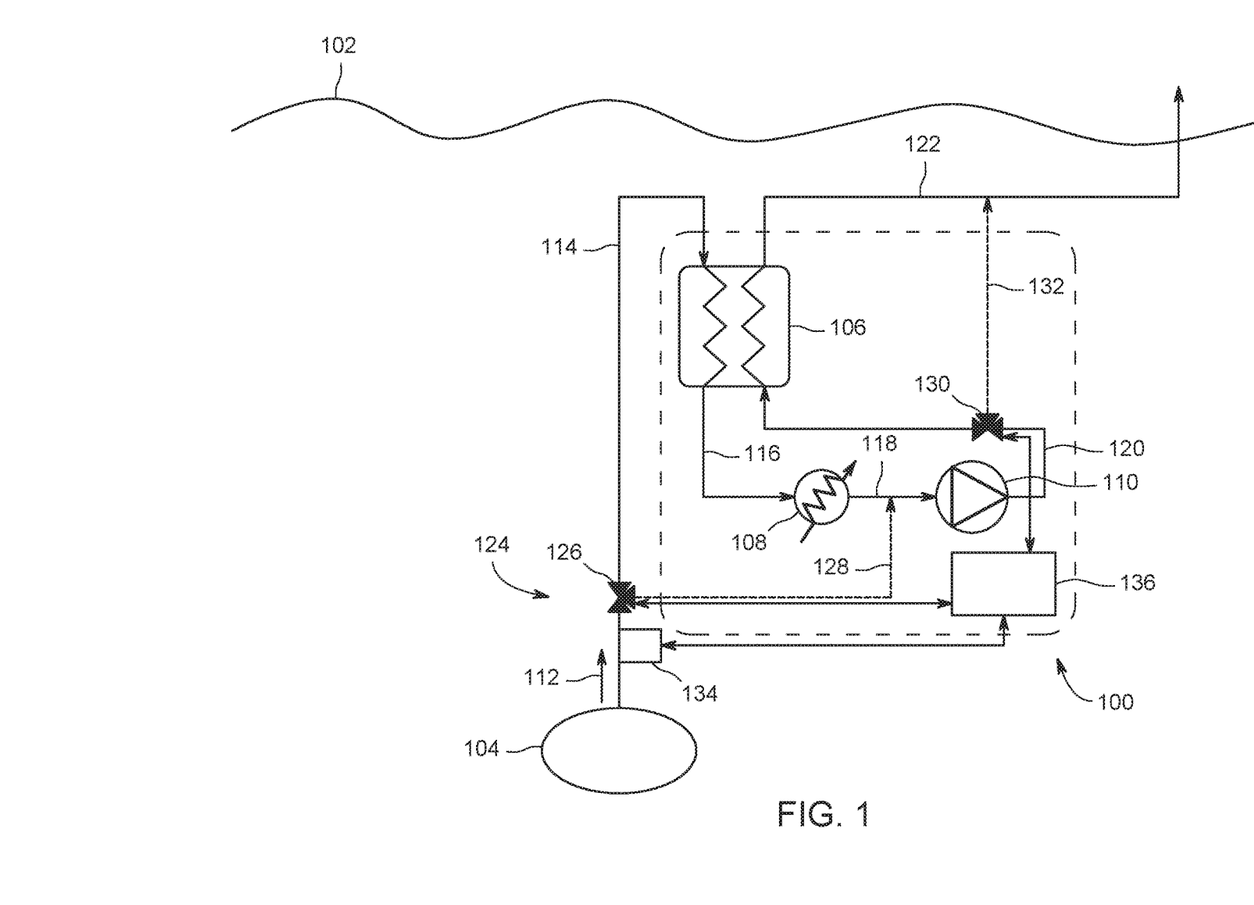
FIG. 1 is a schematic view of an exemplary subsea multiphase pumping system.

FIG. 1 is a schematic view of an exemplary subsea multiphase pumping system 100. In the exemplary embodiment, multiphase pump system 100 is deployed in a subsea environment 102 proximate a hydrocarbon reservoir 104 and is configured to facilitate extraction of production fluids 112 including, but not limited to, petroleum fluids and water. As used herein, petroleum fluids refer to mineral hydrocarbon substances such as crude oil, gas, and combinations thereof.

Multiphase pump system 100, includes a recuperator 106, a cooler 108, and a multiphase pump 110 coupled together in a serial flow relationship. Recuperator 106 is coupled to hydrocarbon reservoir 104 via an inlet line 114. Cooler 108 is coupled to recuperator 106 via a cooling line 116. Pump 110 is coupled to cooler 108 via a pump line 118. Recuperator 106 is coupled to pump 110 via a recuperator line 120. In operation, production fluid 112, including a gas phase and a liquid phase, such as oil and/or water, is extracted from hydrocarbon reservoir 104 and channeled into pump system 100 at recuperator 106 via inlet line 114. Production fluid 112 from inlet line 114 has thermal energy removed at recuperator 106. Recuperator 106 is positioned upstream of cooler 108 and production fluid 112 is channeled to cooler 108 via cooling line 116. Production fluid 112 from cooling line 116 further has thermal energy removed at cooler 108. Cooler 108 is positioned downstream of recuperator 106 and upstream of multistage pump 110. Production fluid 112 from cooler 108 is channeled to pump 110 via pump line 118 and pressurized within. Pump 110 is positioned downstream of cooler 108 and upstream of recuperator 106. Production fluid 112 from pump 110 is channeled to recuperator 106 via recuperator line 120. Recuperator 106 is positioned downstream of pump 110 and adds thermal energy to production fluid 112. Production fluid 112 flows from recuperator 106 and out of pump system 100 channeled to the surface via a flow line 122.

In the exemplary embodiment, recuperator 106 is configured to remove thermal energy from production fluid 112, e.g., cooling the production fluid, upstream of multiphase pump 110. For example, production fluid 112 flowing within inlet line 114 and upstream of multiphase pump 110 is of a higher temperature than production fluid 112 flowing within recuperator line 120 and downstream of pump 110. Recuperator 106 cools production fluid 112 upstream of pump 110 through transferring the thermal energy to production fluid 112 downstream of pump 110, thereby decreasing the temperature of production fluid 112 upstream of pump 110. The thermal energy removed from production fluid 112 is added to production fluid 112 downstream of pump 120, e.g., heating the production fluid, thereby increasing the temperature of production fluid 112 downstream of pump 110. In the exemplary embodiment, recuperator 106 is a heat exchanger. Specifically recuperator 106 is a heat exchanger that is at least one of a counter-flow heat exchanger, a shell and tube heat exchanger, and a plate heat exchanger. In alternative embodiments, recuperator 106 is any other device that facilitates thermal energy transfer as described herein.

Furthermore, in the exemplary embodiment, cooler 108 also removes thermal energy from production fluid 112. Cooler 108 is configured to further cool production fluid 112 upstream of multiphase pump 110. For example, cooler 108 is a passive heat exchanger that is configured to transfer heat from production fluid 112 to an ambient medium channeled within the passive heat exchanger. In the exemplary embodiment, the ambient medium is seawater that pump system 100 is submerged within. In alternative embodiments, the ambient medium is any other medium that allows cooler 108 to operate as described herein.

Moreover, in alternative embodiments, cooler 108 is an active system. For example, cooler 108 is an active heat exchanger that is configured to remove thermal energy from production fluid 112 upstream of multiphase pump 110. Cooler 108 transfers thermal energy from production fluid 112 to an ambient medium 113, such as seawater as described above. Additionally, cooler 108 includes a pump 111 that pumps the ambient medium through cooler 108. In another example, cooler 108 includes a pump, a condenser, an evaporator, and a refrigerant (all not shown) that is configured to remove thermal energy from production fluid 112. For example, production fluid 112 is channeled through cooler 108 such that thermal energy is transferred from production fluid 112 to the refrigerant, evaporating the refrigerant, condensing the refrigerant, and compressing the refrigerant. In yet further alternative embodiments, cooler 108 is any device that facilitates thermal energy transfer as described herein.

In the exemplary embodiment, pump 110 is configured to increase pressure of production fluid 112 channeling the fluid to the surface. For example, pump 110 receives production fluid 112 from recuperator 106 and/or cooler 108 at a low pressure and discharges production fluid 112 to recuperator 106 at a higher pressure. In alternative embodiments, pump 110 is a plurality of pumps coupled in parallel or in series to each other for boosting pressure of production fluid 112.

Additionally, in the exemplary embodiment, production fluid 112 includes a combination of oil, gas, and/or water. Pump 110 has a gas volume fraction limit in which fluids with a high gas to volume ratio are potentially damaging to the pump. Both recuperator 106 and cooler 108 facilitate reducing the temperature of production fluid 112. Reducing the temperature of production fluid 112 condenses the gas within and thereby reduces the gas volume fraction of the production fluid 112 and increases pump 110 efficiency and life-cycle.

In some embodiments, pumping system 100 further includes a bypass system 124 that is configured to bypass recuperator 106 and cooler 108 when production fluid 112 has a gas volume fraction within a predetermined threshold value of the operational limits of multiphase pump 110. Bypass system 124 includes a first bypass valve 126 positioned within inlet line 114, upstream of recuperator 106, and in fluid communication with recuperator 106 and pump 110. A first bypass line 128 is configured to channel production fluid 112 from inlet line 114 to pump 110 and extends between first bypass valve 126 and pump line 118 upstream of pump 110. Bypass system 124 also includes a second bypass valve 130 positioned within recuperator line 120, downstream of pump 110, and in fluid communication with pump 110 and recuperator 106. A second bypass line 132 is configured to channel production fluid 112 from pump 110 to flow line 122 and extends between second bypass valve 130 and flow line 122 downstream of pump 110.

Bypass system 124 further includes a sensor 134 located upstream of first bypass valve 126 that measures a gas volume fraction of production fluid 112 and a controller 136 operably coupled to each of first bypass valve 126, second bypass valve 130, and sensor 134. In operation, controller 136 receives the measurements of the gas volume fraction from sensor 134 and controls the position of first and second bypass valves 126 and 130. For example, sensor 134 provides data to controller 136 and controller 136 determines whether the measured gas volume fraction exceeds a predetermined threshold value. When controller 136 determines the measured gas volume fraction of production fluid 112 is equal to or does not exceed the predetermined threshold value, controller 136 changes the position of first and second bypass valves 126 and 130 such that production fluid 112 flows though first bypass line 128 to pump 110 and from pump 110 through second bypass line 132 to flow line 122 and to the surface. When controller 136 determines the measured gas volume fraction of production fluid 112 does exceed the predetermined threshold value, controller 136 changes the position of first and second bypass valves 126 and 130 such that production fluid 112 flows though recuperator 106 and cooler 108 as described in detail above.

Figure 2:
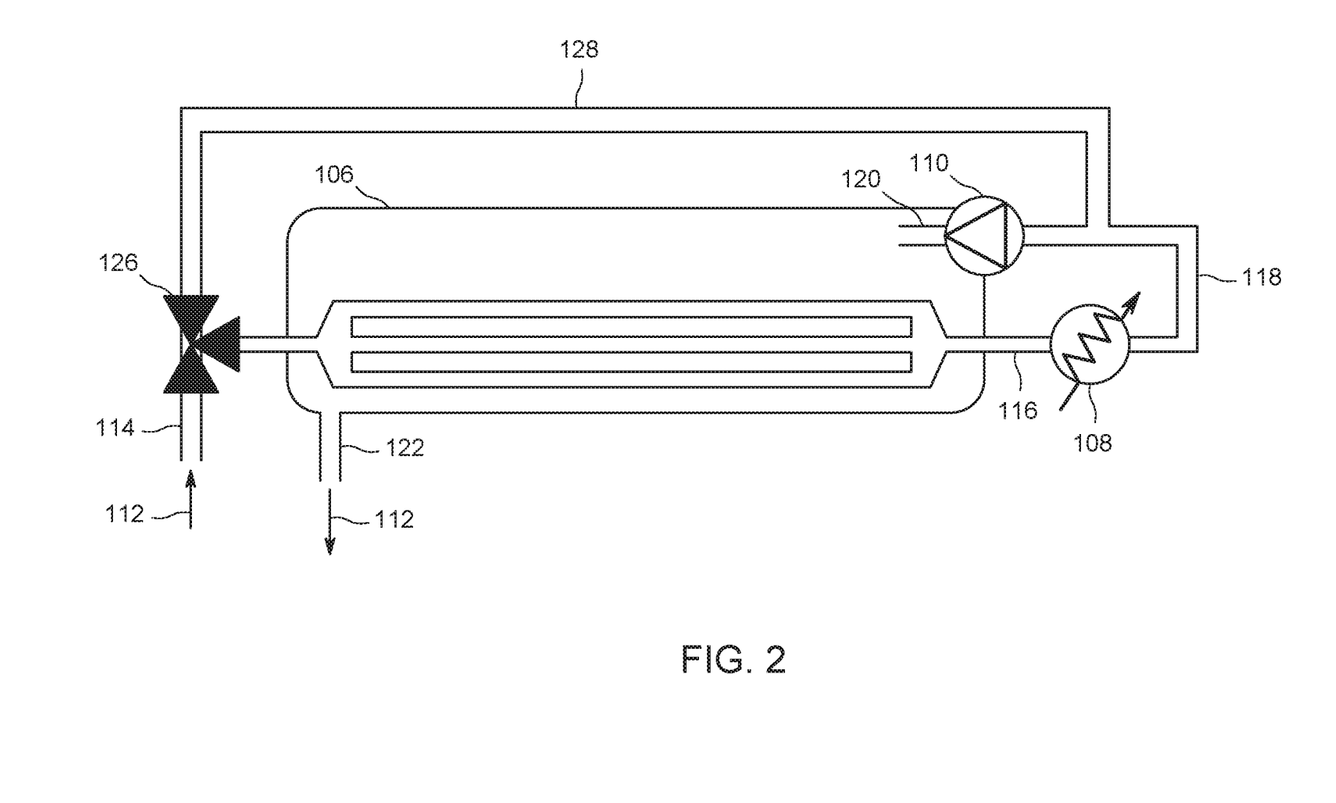
FIG. 2 is a schematic view of an exemplary recuperator that may be used with the pumping system shown in FIG. 1.

FIG. 2 is a schematic view of an exemplary recuperator 106 that may be used with the pumping system shown in FIG. 1. In the exemplary embodiment, recuperator 106 is a passive heat exchanger with first bypass line 128. Similar to the system discussed above, production fluid 112 is channeled through inlet line 114. Production fluid 112 is received at recuperator 106, where thermal energy is removed, and further channeled in cooling line 116 to cooler 108. Cooler 108 further removes thermal energy from production fluid 112 that is channeled in pump line 118 to multiphase pump 110. Production fluid 112 is pressurized at pump 110 and subsequently channeled in recuperator line 120 to recuperator 106 that adds thermal energy to production fluid 112. From recuperator 106 production fluid 112 is lifted to the surface in flow line 122. Additionally, first bypass valve 126 is positioned within inlet line 114 and is configured to direct production fluid 112 to first bypass line 128 when production fluid 112 has a gas volume fraction above a predetermined threshold value and to direct production fluid 112 to recuperator 106 when production fluid 112 has a gas volume fraction below a predetermined threshold value. However, in this embodiment, production fluid 112 is pumped through recuperator 106 to flow line 122 and second bypass valve and line 130 and 132 are not present.

In the exemplary embodiment, recuperator 106 is a counter flow heat exchanger sized and configured to remove thermal energy from production fluid 112 upstream of multiphase pump 110 and add thermal energy to production fluid 112 downstream of pump 110. Removing thermal energy from production fluid 112 facilitates gas condensation within production fluid 112 thereby lowering the gas volume fraction for pumping. However, in low-temperature environments deposits, such as hydrates, waxes, and/or asphaltenes, may restrict flow within pipelines, such as flow line 122. For example, hydrates, i.e., any compound containing water in the form of H$_2$O molecules tend to freeze and restrict natural gas flow through a pipeline in low-temperature environments. Additionally, wax and asphaltenes, i.e., molecular substances found in crude oil, and scale deposition may also restrict flow through a pipeline.

Adding thermal energy to production fluid 112 facilitates reduction in deposits, such as hydrates, waxes, and/or asphaltenes, within pipelines. Cooling production fluid 112 by recuperator 106 and cooler 108 reduces the heat within production fluid 112 that facilitates prevention of deposit build-up. Thus, adding thermal energy into production fluid 112 downstream of pump 110 reduces deposit build-up within system 100. Moreover, in the exemplary embodiment, pump 110 is positioned in close proximity to recuperator 106 such that the distance the cooler production fluid 112 travels is lowered, further reducing deposit build-up within system 100. Furthermore, cooler 108 and pump 110 are also positioned in close proximity to one another to reduce deposit build-up. Also, in the exemplary embodiment, pump 110 is configured to produce a large amount of agitation within production fluid 112 around the pump area. The agitation around the pump area further reduces deposit build-up within system 100. In alternative embodiments, system 100 has any other design that facilitates deposit build-up reduction as described herein.

Additionally, in the exemplary embodiment, recuperator 106 is configured to remove more thermal energy from production fluid 112 upstream of multiphase pump 110 than cooler 108. Removing more thermal energy from production fluid 112 at recuperator 106 allows for more thermal energy to be added to production fluid 112 downstream of multiphase pump 110, thereby facilitating reduction in deposit build-up within system 100. Furthermore, a reduced amount of thermal energy will removed at cooler 108 thereby reducing the size of cooler 108 and reducing the amount of thermal energy lost to the surrounding seawater.

Figure 3:
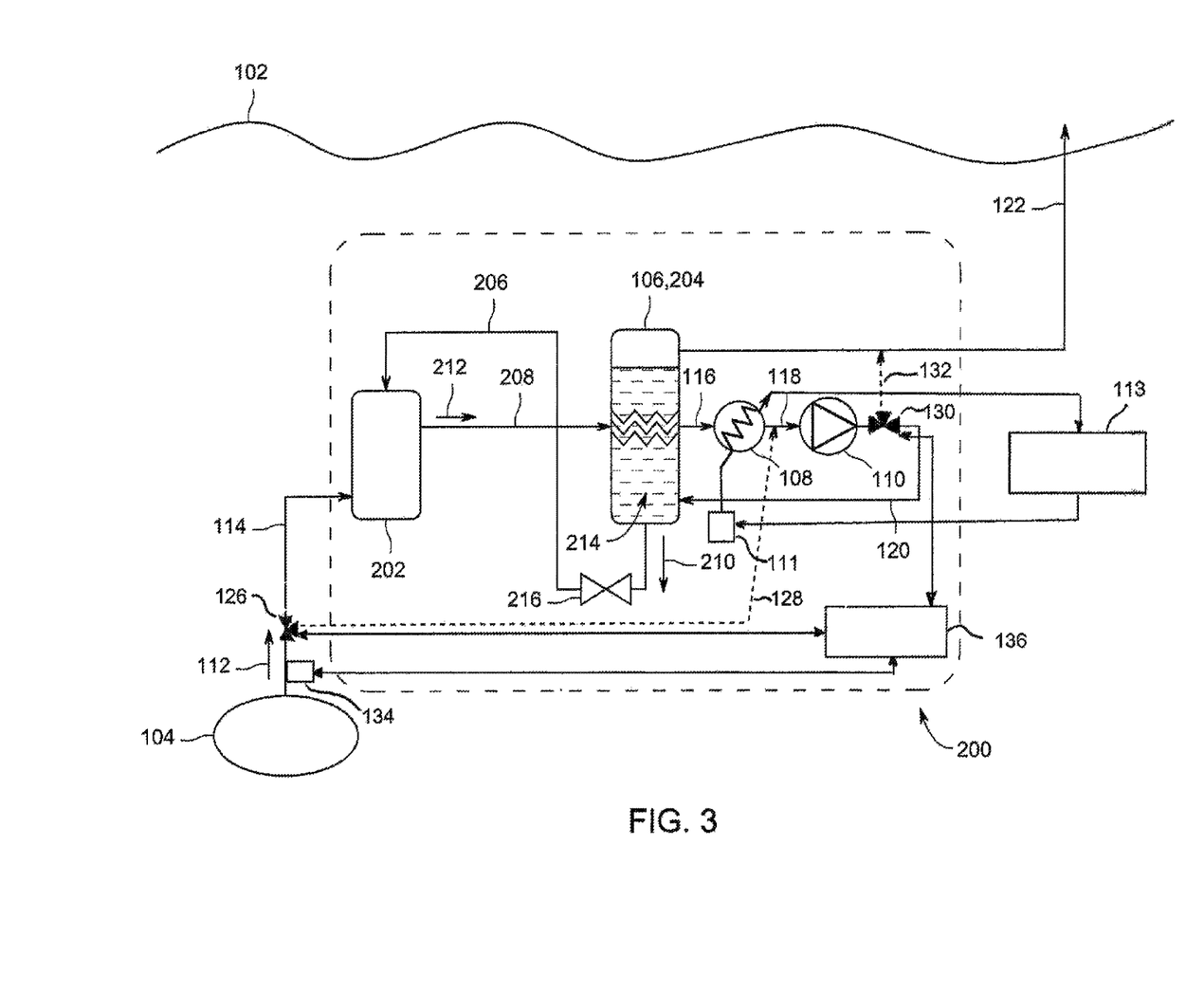
FIG. 3 is a schematic view of an alternative subsea multiphase pumping system.

FIG. 3 is a schematic view of an alternative subsea multiphase pumping system 200. In this alternative embodiment, pump system 200 includes recuperator 106, cooler 108, and multiphase pump 110 that facilitate extraction of production fluids 112 from hydrocarbon reservoir 104 to the surface via flow line 122 as described above in reference to FIG. 1. Additionally, in this alternative embodiment, pump system 200 includes an inlet tank 202, a separator 204, and a separator line 206. Inlet tank 202 is coupled to hydrocarbon reservoir 104 via inlet line 114. Recuperator 106 is coupled to inlet tank 202 via a feed line 208. Separator 204 is also coupled to inlet tank 202 via separator line 206. Cooler 108 is coupled to recuperator 106 via a cooling line 116. Pump 110 is coupled to cooler 108 via a pump line 118. Recuperator 106 is coupled to pump 110 via recuperator line 120. In this embodiment, separator 204 is integrated with recuperator 106. In alternative embodiments, separator 204 and recuperator 106 are any other system that allows pump system 200 to operate as described herein.

In operation, production fluid 112 is extracted from hydrocarbon reservoir 104 and flowed into pump system 200 at inlet tank 202 via inlet line 114. Production fluid 112 from inlet line 114 is mixed with a recirculated liquid fluid 210 from separator 204 and separation line 206 forming a fluid mixture 212. Inlet tank 202 is positioned upstream of recuperator 106 and fluid mixture 212 is channeled from inlet tank 202 to recuperator 106. Fluid mixture 212 from inlet tank 202 has thermal energy removed at recuperator 106. Recuperator 106 is positioned upstream of cooler 108 and fluid mixture 212 is channeled to cooler 108 via cooling line 116. Fluid mixture 212 from cooling line 116 further has thermal energy removed at cooler 108. Cooler 108 is positioned downstream of recuperator 106 and upstream of multistage pump 110. Fluid mixture 212 from cooler 108 is channeled to pump 110 via a pump line 118 and pressurized within. Pump 110 is positioned downstream of cooler 108 and upstream of recuperator 106. Fluid mixture 212 from pump 110 is channeled to recuperator 106 and separator 204 via recuperator line 120. Recuperator 106 and separator 204 are positioned downstream of pump 110, separator 204 separates the gas phase and liquid phase within fluid mixture 212 and recuperator 106 adds thermal energy to fluid mixture 212. A portion of fluid mixture 212 flows from recuperator 106/separator 204 and out of pump system 100 lifting fluid mixture 212 to the surface via flow line 122, while a portion of fluid mixture 212 is recirculated into inlet tank 202.

In this alternative embodiment, separator 204 is downstream of multiphase pump 110 and facilitates separating the gas phase from the liquid phase within fluid mixture 212. Separator 204 is coupled to inlet tank 202 via separator line 206 and is configured to flow a portion of the separated liquid, now liquid fluid 210, to inlet tank 202. For example, a liquid reservoir 214 within separator 204 is configured to store/accumulate liquid fluid 210. Liquid fluid 210 is of a lower gas volume fraction after being separated with the gas phase. Separator 204 provides liquid fluid 210 to inlet tank 202 via separator line 206 and valve 216. Valve 216 is controlled by controller 136 (shown in FIG. 1) that controls the flow rate of liquid fluid 210 based on the measured gas volume fraction of production fluid 112.

Furthermore, in this alternative embodiment, inlet tank 202 is a buffer tank that receives production fluid 112 from inlet line 114 and liquid fluid 210 from separator line 206. Inlet tank 202 is configured to mix production fluid 112 and liquid fluid 210 forming fluid mixture 212 that has a lower gas volume fraction than production fluid 112. Similar to the embodiment described above in reference to FIG. 1, fluid mixture 212 is cooled at recuperator 106 and further cooled at cooler 108 to further decrease the gas volume fraction within fluid mixture 212. Fluid mixture 212 is pressurized at pump 110 and heated at recuperator 106 before being lifted to the surface. In alternative embodiments, pump system 200 includes a bypass system with a controller, such as bypass system 124 and controller 136 as described above, for directly pumping production fluid 112 with a gas volume fraction at or below the predetermined threshold value.

Figure 4:
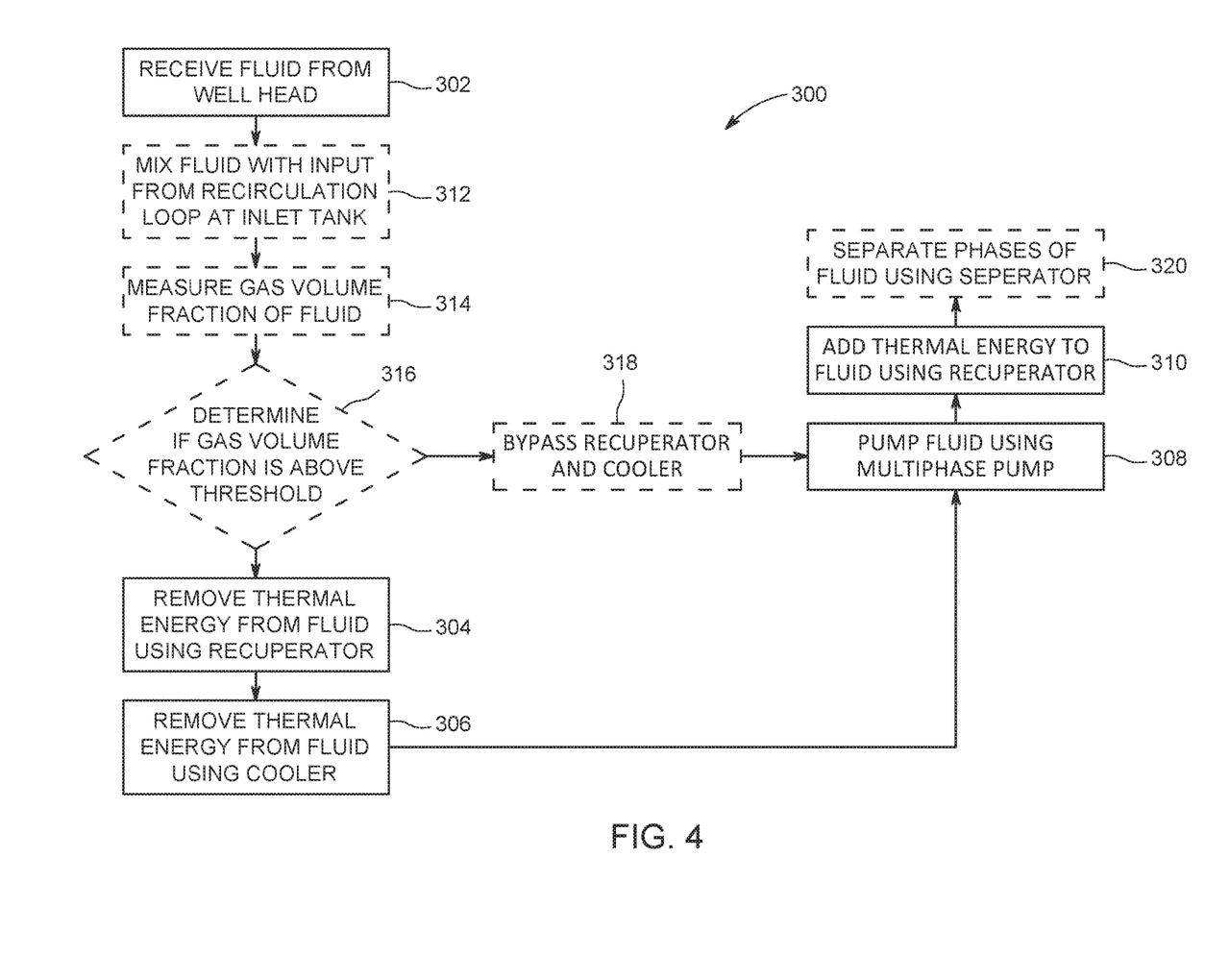
FIG. 4 is a flow chart of an exemplary method of transporting a fluid using the subsea multiphase pumping systems shown in FIGS. 1 and 3.

FIG. 4 is a flow chart of an exemplary method 300 of transporting a fluid using a subsea multiphase pumping system, such as system 100 and 200 (shown in FIGS. 1 and 3 respectively). Referring to FIGS. 1-4, in the exemplary embodiment, method 300 includes receiving 302 fluid, such as production fluid 112, by pumping system 100 and 200 from a well head. Method 300 further includes removing 304 thermal energy from the fluid using a recuperator, such as recuperator 106, downstream of a multiphase pump, such as pump 110, and also, removing 306 thermal energy from the fluid using a cooler, such as cooler 108, downstream of pump 110. Moreover, method 300 includes pumping 308 the fluid using pump 110, and adding 310 thermal energy to the fluid using recuperator 106 before lifting the fluid to the surface.

In alternative embodiments, method 300 includes mixing 312 the fluid with an input, such as liquid fluid 210, from a recirculation loop, such as separator line 206, at an inlet tank, such as inlet tank 202, after receiving 302 the fluid from the well head and before removing 304 thermal energy from the fluid using recuperator 106. Additionally, in alternative embodiments, method 300 includes measuring 314 the gas volume fraction of fluid and determining 316 if the gas volume fraction is above a predefined threshold value, after receiving 302 the fluid from the well head and before removing 304 thermal energy from the fluid using recuperator 106. If the measured gas volume fraction is below the predefined threshold gas volume fraction value then method 300 includes bypassing 318 recuperator 106 and cooler 108 before pumping 308 using multiphase pump 110. If the measured gas volume fraction is at or above the predefined threshold gas volume fraction value then method 300 includes removing 304 thermal energy from the fluid using recuperator 106 as described further above. Furthermore, in alternative embodiments, method 300 includes separating 320 the gas and liquid phases of the fluid using a separator, such as separator 204, after adding 310 thermal energy to the fluid using recuperator 106.

The above described subsea multiphase pumping systems and methods as described herein overcome a number of deficiencies associated with known systems and methods of subsea pumping stations. Specifically, the pumping systems use a recuperator and a cooler to remove thermal energy from the production fluid, condensing the gas phase therein, and lowering the gas volume fraction of the production fluid. The multiphase pump intakes the production fluid with a gas volume fraction below the pump specifications, thereby reducing the impact of gas slugs within the production fluid on the pump. Downstream of the multiphase pump the production fluid is channeled through the recuperator which adds thermal energy to the production fluid. This heating of the production fluid reduces formation of deposits, such as hydrates, waxes, and asphaltenes, within the system pipeline as the production fluid is lifted towards the surface. As such, the pumping systems and methods described herein offer advantages that include, without limitation, increased pump efficiency, increased pump life-cycle, as well as reduced system cost. Additionally, the pumping systems and methods facilitate system size reduction and integration with other known subsea pumping systems currently in use.

An exemplary technical effect of the methods, systems, and apparatus described herein includes at least one of: (a) decreasing the gas volume fraction of the production fluid upstream of the multiphase pump through removing thermal energy at the recuperator and the cooler; (b) increasing pump efficiency through decreasing the gas volume fraction of the production fluid; (c) increasing pump life-cycle through decreasing gas slugs within the production fluid; (d) reducing formation of deposits, such as hydrates, waxes, and asphaltenes, through adding thermal energy to the production fluid downstream of the pump; (e) reducing system size of the subsea multiphase pumping system through use of a recuperator; and (f) facilitating integration with known subsea pumping systems through integrating the recuperator with the separator.

Exemplary embodiments of subsea multiphase pumping systems and methods are described above in detail. The subsea multiphase pumping systems, and methods of operating such systems and devices are not limited to the specific embodiments described herein, but rather, components of systems and/or steps of the methods may be utilized independently and separately from other components and/or steps described herein. For example, the systems, apparatus, and methods may also be used in combination with other systems requiring reduction of a gas volume fraction of a multiphase liquid, and are not limited to practice with only the facilities, systems and methods as described herein. Rather, the exemplary embodiment can be implemented and utilized in connection with many other pumping applications that are configured to reduce the gas volume fraction of a liquid.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A multiphase pumping system for transporting a fluid, the system comprising:
   a multiphase pump configured to increase pressure within the fluid;
   a recuperator in fluid communication with the multiphase pump, the recuperator including a cooling portion configured to remove thermal energy from the fluid upstream of the multiphase pump and a heating portion to add thermal energy to the fluid downstream of the multiphase pump;
   a cooler disposed fluidly upstream of the multiphase pump and configured to further remove thermal energy from the fluid cooled by the recuperator upstream of said multiphase pump; and
   a bypass system configured to provide the fluid to the multiphase pump bypassing the cooling portion of the recuperator and the cooler, the bypass system comprising:
      a first bypass valve in fluid communication with the recuperator, the first bypass valve positioned upstream of the recuperator; and
      a first bypass line in fluid communication with the first bypass valve, the first bypass line terminating upstream of the multiphase pump and downstream of the cooling portion of the recuperator and the cooler.

2. The multiphase pumping system of claim 1, wherein said recuperator comprises a heat exchanger configured to transfer thermal energy from the fluid upstream of said cooler to the fluid downstream of the pump.

3. The multiphase pumping system of claim 1 further comprising a separator configured to separate a gas phase of the fluid from a liquid phase of the fluid, the separator positioned downstream from said multiphase pump, wherein the recuperator is integrated within the separator.

4. The multiphase pumping system of claim 1 further comprising:
   a separator configured to separate a gas phase of the fluid from a liquid phase of the fluid, the separator positioned downstream from the multiphase pump;
   an inlet tank located upstream from the recuperator configured to mix the fluid with at least a portion of the liquid phase of the fluid from the separator; and
   a valve configured to control flow of the liquid phase of the fluid from the separator to the inlet tank.

5. The multiphase pumping system of claim 4, wherein said recuperator comprises a heat exchanger disposed within the separator configured to transfer thermal energy from the fluid received from the inlet tank to heat the fluid within the separator.

6. The multiphase pumping system of claim 1, wherein the bypass system further comprises:
   a sensor located upstream of the recuperator, the sensor configured to measure a gas volume fraction of the fluid; and
   a controller configured to receive measurements of the gas volume fraction from the sensor, the controller further configured to control a valve position of the first bypass valve, the controller further configured to change a valve position of the first bypass valve such that the fluid diverts through the first bypass line in response to determining that the gas volume fraction does not exceed a predetermined threshold value.

7. The multiphase pumping system of claim 6, wherein the bypass system further comprises:
   a second bypass valve in fluid communication with said recuperator, said second bypass valve positioned downstream of the multiphase pump and upstream of the heating portion of the recuperator; and
   a second bypass line in fluid communication with said second bypass valve, said second bypass line terminating downstream of the multiphase pump and downstream of the recuperator bypassing the heating portion of the recuperator;
   wherein the controller is further configured to control a valve position of the second bypass valve and to change the valve position of the second bypass valve such that the fluid diverts through the second bypass line in response to determining that the gas volume fraction does not exceed a predetermined threshold value.

8. The multiphase pumping system of claim 1, wherein the cooler comprises a passive heat exchanger configured to remove thermal energy from the fluid by transferring heat from the fluid to an ambient medium in contact with the passive heat exchanger.

9. The multiphase pumping system of claim 8, wherein the ambient medium is seawater.

10. The multiphase pumping system of claim 1, wherein the cooler comprises:
    a heat exchanger configured to transfer thermal energy from the fluid to an ambient medium; and
    a second pump configured to pump the ambient medium through the heat exchanger.

11. The multiphase pumping system of claim 1, wherein the bypass system further comprises:
a second bypass valve in fluid communication with said recuperator, said second bypass valve positioned downstream of the multiphase pump and upstream of the heating portion of the recuperator; and
a second bypass line in fluid communication with said second bypass valve, said second bypass line terminating downstream of the multiphase pump and downstream of the recuperator bypassing the heating portion of the recuperator.

12. The multiphase pumping system of claim 1, wherein the multiphase pump is in close proximity to the recuperator to reduce the distance the fluid cooled by the cooler to reduce deposit build-up within multiphase pumping system.

13. A method of transporting a fluid using a multiphase pumping system including a multiphase pump configured to transport the fluid, a cooler, and a recuperator, said method comprising:
receiving the fluid by the multiphase pumping system;
removing thermal energy upstream of the multiphase pump from the fluid using a cooling portion of the recuperator;
removing thermal energy upstream of the multiphase pump from the fluid using the cooler;
pumping the fluid using the multiphase pump;
adding thermal energy downstream of the multiphase pump from the fluid using a heating portion of the recuperator; and
bypassing selectively the fluid around the cooling portion of the recuperator and the cooler to the multiphase pump.

14. The method of claim 13, wherein removing thermal energy from the fluid using the recuperator of the multiphase pumping system comprises condensing at least a portion of a gas phase of the fluid by transferring heat from the fluid upstream of the recuperator, the cooler, and the multiphase pump to the fluid downstream of the multiphase pump.

15. The method of claim 13, wherein adding thermal energy to the fluid using the recuperator comprises inhibiting formation of hydrates within the fluid by transferring heat from the fluid upstream of the recuperator, the cooler, and the multiphase pump to the fluid downstream of the multiphase pump.

16. The method of claim 13 further comprising separating the fluid into a gas phase and a liquid phase downstream of the multiphase pump using a separator, wherein the recuperator is integrated within the separator.

17. The method of claim 13 further comprising:
separating the fluid into a gas phase and a liquid phase downstream of the multiphase pump using a separator, wherein the recuperator is integrated within the separator;
opening a valve in fluid communication with the separator and an inlet tank; and
mixing the liquid phase of the fluid from the separator with the fluid upstream of the recuperator, cooler, and multiphase pump using the inlet tank.

18. The method of claim 13, wherein the bypassing selectively the fluid comprises actuating a bypass valve in fluid communication with the recuperator and positioned upstream of the recuperator such that the fluid enters a bypass line which terminates upstream of the multiphase pump and downstream of the cooler and the cooling portion of the recuperator, and such that the fluid is not cooled by the cooling portion of the recuperator and is not cooled by the cooler.

19. The method of claim 13, further comprising:
measuring a gas volume fraction of the fluid, using a sensor, at a point upstream of the bypass valve;
receiving the measured gas volume fraction of the fluid by a controller; and
determining, by the controller, that the received measured gas volume fraction does not exceed a predetermined threshold value.

* * * * *